US012677083B2

(12) United States Patent
Matsumoto et al.

(10) Patent No.: US 12,677,083 B2
(45) Date of Patent: Jul. 7, 2026

(54) COMMUNICATION CONTROL METHOD, COMMUNICATION CONTROL APPARATUS AND PROGRAM

(71) Applicant: NATIONAL INSTITUTE OF ADVANCED INDUSTRIAL SCIENCE AND TECHNOLOGY, Tokyo (JP)

(72) Inventors: Ryosuke Matsumoto, Ibaraki (JP); Ken-ichi Sato, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 339 days.

(21) Appl. No.: 18/691,869

(22) PCT Filed: Aug. 18, 2022

(86) PCT No.: PCT/JP2022/031174
§ 371 (c)(1),
(2) Date: Mar. 13, 2024

(87) PCT Pub. No.: WO2023/042596
PCT Pub. Date: Mar. 23, 2023

(65) Prior Publication Data
US 2024/0430599 A1 Dec. 26, 2024

(30) Foreign Application Priority Data
Sep. 17, 2021 (JP) ................................. 2021-151662

(51) Int. Cl.
*H04Q 11/00* (2006.01)
*H04L 45/60* (2022.01)

(52) U.S. Cl.
CPC ......... *H04Q 11/0071* (2013.01); *H04L 45/60* (2013.01)

(58) Field of Classification Search
None
See application file for complete search history.

(56) References Cited

U.S. PATENT DOCUMENTS 8,483,096 B2 7/2013 Vahdat et al.
9,036,481 B1 5/2015 White
(Continued)

FOREIGN PATENT DOCUMENTS

JP 2003333081 11/2003
WO 2016051498 4/2016
WO 2021166665 8/2021

OTHER PUBLICATIONS

Tang et al. "Flow Splitter: A Deep Reinforcement Learning-Based Flow Scheduler for Hybrid Optical-Electrical Data Center Network", Sep. 11, 2019, IEEE Access vol. 7, pp. 129955-129965 (Year: 2019).*

(Continued)

*Primary Examiner* — David W Lambert
(74) *Attorney, Agent, or Firm* — JCIPRNET

(57) ABSTRACT

In order to perform data transfer efficiently in an electro-optical hybrid switch network, monitor data that is a blocking rate in an optical line switching network, an amount concerning flows transferred by a connection apparatus to an electric packet network, a buffer utilization state in telecommunication devices within the electric packet network, or packet transfer latency or the like in telecommunication devices is obtained, and based on the monitor data, a threshold for distinguishing a first flow to be transferred by the connection apparatus through the optical line switching network from a second flow to be transferred by the connection apparatus through the electric packet network is (Continued)

changed, wherein the threshold is to identify, as the first flow, a flow that has a size exceeding the threshold and identify, as the second flow, a flow that has a size that is equal to or less than the threshold.

11 Claims, 13 Drawing Sheets

(56) References Cited

U.S. PATENT DOCUMENTS

| | | |
|---|---|---|
| 2003/0161633 A1 | 8/2003 | Oki et al. |
| 2023/0055239 A1 | 2/2023 | Matsumoto et al. |

OTHER PUBLICATIONS

Arjun Singh et al., "Jupiter Rising: A Decade of Clos Topologies and Centralized Control in Google's Datacenter Network", Proc. ACM SIGCOMM 2015 Conference (SIGCOMM '15), Aug. 17-21, 2015, pp. 183-197, London, United Kingdom.

Nathan Farrington et al., "Helios: A Hybrid Electrical/Optical Switch Architecture for Modular Data Centers", Proc. ACM SIGCOMM 2010 Conference (SIGCOMM '10), Aug. 30-Sep. 3, 2010, pp. 339-350, New Delhi, India.

Ken-Ichi Sato, "Realization and Application of Large-Scale Fast Optical Circuit Switch for Data Center Networking", Journal of Lightwave Technology, Apr. 1, 2018, pp. 1411-1419, vol. 36, No. 7.

Yinan Tang et al., "Flow Splitter: A Deep Reinforcement Learning Based Flow Scheduler for Hybrid Optical-Electrical Data Center Network", IEEE Access, Sep. 11, 2019, pp. 1-11, vol. 7.

Takehiro Tsuritani et al., "Study on GMPLS-controlled Translucent WSON using OSNR-based Impairment Aware-RWA Algorithm", IEICE Technical Report, Jun. 18, 2009, with English abstract, pp. 51-56, vol. 109, No. 104.

Yutaro Hara et al., "A Study of Next Generation Metro-Access Hybrid Scalable Network by Using PLZT Ultra High Speed Optical Wavelength Selective Switch", IEICE Technical Report, Feb. 24, 2011, with English abstract, pp. 13-18, vol. 110, No. 448.

Hiroyuki Yokoyama et al., "Compatibility of Best Effort Multi-Wavelength Path Assignment with TCP Flow Control", Proceedings of The 2003 IEICE General Conference, Mar. 3, 2003, pp. 346.

"International Search Report (Form PCT/ISA/210) of PCT/JP2022/031174", mailed on Nov. 8, 2022, with English translation thereof, pp. 1-6.

"Written Opinion of the International Searching Authority (Form PCT/ISA/237) of PCT/JP2022/031174", mailed on Nov. 8, 2022, with English translation thereof, pp. 1-13.

"Office Action of Japan Counterpart Application", issued on Apr. 22, 2025, with English translation thereof, p. 1-p. 18.

* cited by examiner

| INPUT PORT | OUTPUT PORT | | | | | |
|---|---|---|---|---|---|---|
| | 1 | 2 | 3 | . | . | Q |
| 1 | − | ○ | × | ○ | ○ | ○ |
| 2 | × | − | × | × | × | × |
| 3 | × | ○ | − | ○ | ○ | ○ |
| . | × | ○ | × | − | ○ | ○ |
| . | × | ○ | × | ○ | − | ○ |
| P | × | × | × | × | × | × |

FIG.10

COMMUNICATION CONTROL METHOD, COMMUNICATION CONTROL APPARATUS AND PROGRAM

CROSS-REFERENCE TO RELATED APPLICATION

This application is a 371 application of the International PCT application serial no. PCT/JP2022/031174 filed on Aug. 18, 2022, which claims the priority benefit of Japan Patent Application No. 2021-151662 filed on Sep. 17, 2021. The entirety of each of the above-mentioned patent applications is hereby incorporated by reference herein and made a part of this specification.

TECHNICAL FIELD

This invention relates to communication control technology for controlling communication in an electro-optical hybrid switch network.

BACKGROUND ART

The advent of the fifth-generation mobile communication system (5G) and the Internet of Things (IoT) is spurring an increase in communication traffic within data centers. For example, the IP traffic among data centers worldwide is expected to reach 20.6 zettabytes in 2021, of which approximately 75% will be processed within data centers. On the other hand, current networks within data centers are constructed using multiple layers of electric switches (for example, Non-Patent Literature 1), and the power consumption of large-scale data centers reaches tens of thousands to hundreds of thousands of kW. Furthermore, in order to process large-capacity and large-volume communication traffic, it is preferable to increase the communication bandwidth of the network within the data center and reduce the power consumption.

In current networks within data centers, the electric switch/router configuration has a hierarchical structure, and top-of-rack (ToR) switches for consolidating server computers, storages, and the like are located at a lower level. For example, Patent Literature 1 discloses an example of the configuration and control method for networks within data centers based on current electric switches/routers.

In response to such data center demands, an electro-optical hybrid switch network that uses both electric switches and optical switches has been proposed (for example, Non-Patent Literature 2). In the technology described in Non-Patent Literature 2, the server computers and/or storages are connected through the ToR switches, and the ToR switches are connected mutually with the electric switches and optical switches, which are located at the higher level. Further, traffic flows passing through the ToR switch or traffic flows generated from individual server computers or storages are monitored, and a path using electric switches or optical switches is selected depending on the size of the flow. For example, a flow with a small capacity of 15 Mb/s or less is classified as a Mice flow, a flow with a large capacity exceeding that is classified as an Elephant flow, and the Mice flow is processed by electric switches and the Elephant flow is processed by optical switches. By exchanging such large-scale flows with optical lines, electro-optical hybrid switch networks can process large-capacity communication traffic with low power consumption compared to current networks within data centers (that is, multi-layer electric switch configurations). Moreover, an electro-optical hybrid switch network that can accommodate large-scale data centers uses optical line switching switches with about thousand ports, and a method for configuring the same has also been proposed (for example, Non-Patent Literature 3).

For example, as depicted in Non-Patent Literature 3, even if a method is adopted in which Mice flows are processed by electric switches and Elephant flows are processed by optical switches, there remains a problem that how can Mice flows and Elephant flows be distinguished. To address this problem, a method has been proposed for dynamically determining a threshold for distinguishing between Mice flows and Elephant flows for each ToR switch (for example, Non-Patent Literature 4). According to this literature, the threshold is dynamically determined by learning using a neural network, but learning must be performed and the amount of calculations for determining the threshold increases.

Furthermore, in an electro-optical hybrid switch network, even if it is determined to set up an optical line between transmitting and receiving ToR switches to transfer Elephant flows, efficient data transfer across the entire electro-optical hybrid switch network is not possible only with using the optical line.

PRIOR TECHNICAL LITERATURES

Patent Literatures

Patent Literature 1: U.S. Pat. No. 8,483,096

Non-Patent Literatures

Non-Patent Literature 1: Arjun Singh et al., "Jupiter Rising: A Decade of Clos Topologies and Centralized Control in Google's Datacenter Network", Proc. ACM SIGCOMM 2015 Conference (SIGCOMM'15), pp. 88-97, London, United Kingdom, August 2015

Non-Patent Literature 2: Nathan Farrington et al., "Helios: A Hybrid Electrical/Optical Switch Architecture for Modular Data Centers", Proc. ACM SIGCOMM 2010 Conference (SIGCOMM'10), pp. 339-350, New Delhi, India, August 2010

Non-Patent Literature 3: Ken-ichi Sato, "Realization and Application of Large-Scale Fast Optical Circuit Switch for Data Center Networking", IEEE/OSA Journal of Lightwave Technology, Vol. 36,No. 7, pp. 1411-1419, April 2018

Non-Patent Literature 4: Y. Tang et al., "Flow Splitter: A Deep Reinforcement Learning-Based Flow Scheduler for Hybrid Optical-Electrical Data Center Network," in IEEE Access, vol. 7, pp. 129955-129965, 2019, doi:10.1109/ACCESS.2019.2940445.

SUMMARY OF THE INVENTION

Problem to be Solved by the Invention

Therefore, according to one aspect, an object of this invention is to provide a new technique for performing data transfer more efficiently in the electro-optical hybrid switch network.

Means for Solving the Problem

A communication control method relating to a first aspect of the present invention is a communication control method for controlling communication between connection apparatuses that are connected through an optical line switching network and through an electric packet network, each of the connection apparatuses responsible for one or plural devices, the communication control method includes: (A) a step of obtaining monitor data that is a blocking rate at optical line setup in the optical line switching network, an amount concerning flows transferred by the connection apparatus to the electric packet network, a buffer utilization state in telecommunication devices within the electric packet network, or packet transfer latency or a packet dropout rate in telecommunication devices within the electric packet network; and (B) a step of changing, based on the monitor data, a first threshold for distinguishing a first flow to be transferred by the connection apparatuses through the optical line switching network from a second flow transferred by the connection apparatuses through the electric packet network, wherein the first threshold is to identify, as the first flow, a flow that has a size exceeding the first threshold and identify, as the second flow, a flow that has a size that is equal to or less than the first threshold.

A communication control method according to a second aspect of the present invention is a communication control method for controlling communication between connection apparatuses that are connected through an optical line switching network and through an electric packet network, each of the connection apparatuses responsible for one or plural devices, the communication control method includes: (A) a step of determining whether or not a flow rate of a flow that is transferred through an optical line set between certain connection apparatuses in the optical line switching network is equal to or less than a threshold; and (B) in case where the flow rate of the flow is equal to or less than the threshold, a step of causing to disconnect the optical line and causing a flow transmission source of the certain connection apparatuses to transmit packets relating to the flow through the electric packet network.

BRIEF DESCRIPTION OF THE DRAWINGS

FIG. 10 is a diagram to depict a table example used to detect blockings;

EMBODIMENTS

Embodiment 1

Figure 1:
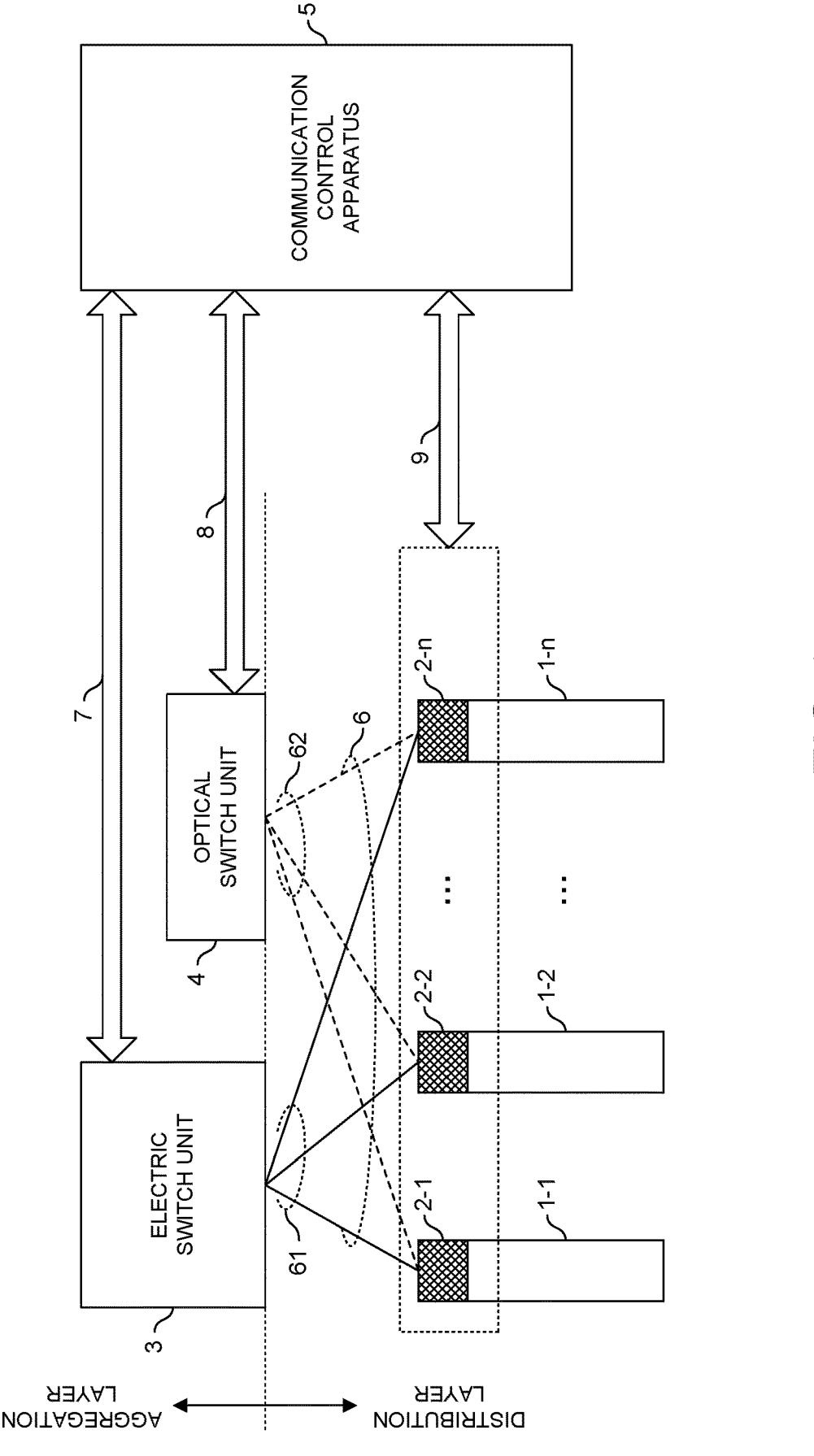
FIG. 1 is a diagram to depict a configuration example of an electro-optical hybrid switch network relating to an embodiment of this invention.

FIG. 1 depicts an example of the configuration of an electro-optical hybrid switch network relating to an embodiment of the present invention. An electro-optical hybrid switch network depicted in FIG. 1 has a rack unit 1, a ToR switch unit 2, an electric switch unit 3, an optical switch unit 4, a communication control apparatus 5, a cable wiring part 6, control lines 7 for the electric is switch unit 3, control lines 8 for the optical switch unit 4, and control lines 9 for the ToR switch unit 2. This electro-optical hybrid switch network is a multi-layer switch network having the ToR switch unit 2 at the lower layer, and the electric switch unit 3 and the optical switch unit 4 at the upper layer. Hereinafter, the lower layer will be referred to as a distribution layer, and the upper layer will be referred to as an aggregation layer. Note that the optical switch unit 4 is an example of an optical line switching network, and the electric switch unit 3 is an example of an electric packet network.

The rack unit 1 includes racks 1-1 to 1-$n$, and the ToR switch unit 2 includes ToR switches 2-1 to 2-$n$. A ToR switch is an electric switch or an electric router, and is an example of a connection apparatus. Each ToR switch of the ToR switch unit 2 and the electric switch unit 3 are connected by an electric or optical cable wiring part 61. Each ToR switch of the ToR switch unit 2 and the optical switch unit 4 are connected by an optical cable wiring part 62. For example, in the data center disclosed in Non-Patent Literature 1, the ToR switch unit 2 may include approximately 1,000 or more ToR switches, and in that case, approximately tens of thousands to hundreds of thousands of servers are accommodated. The server is an example of an information processing apparatus, and both of the servers and the storage devices are apparatuses for which the ToR switch is responsible.

Figure 2:
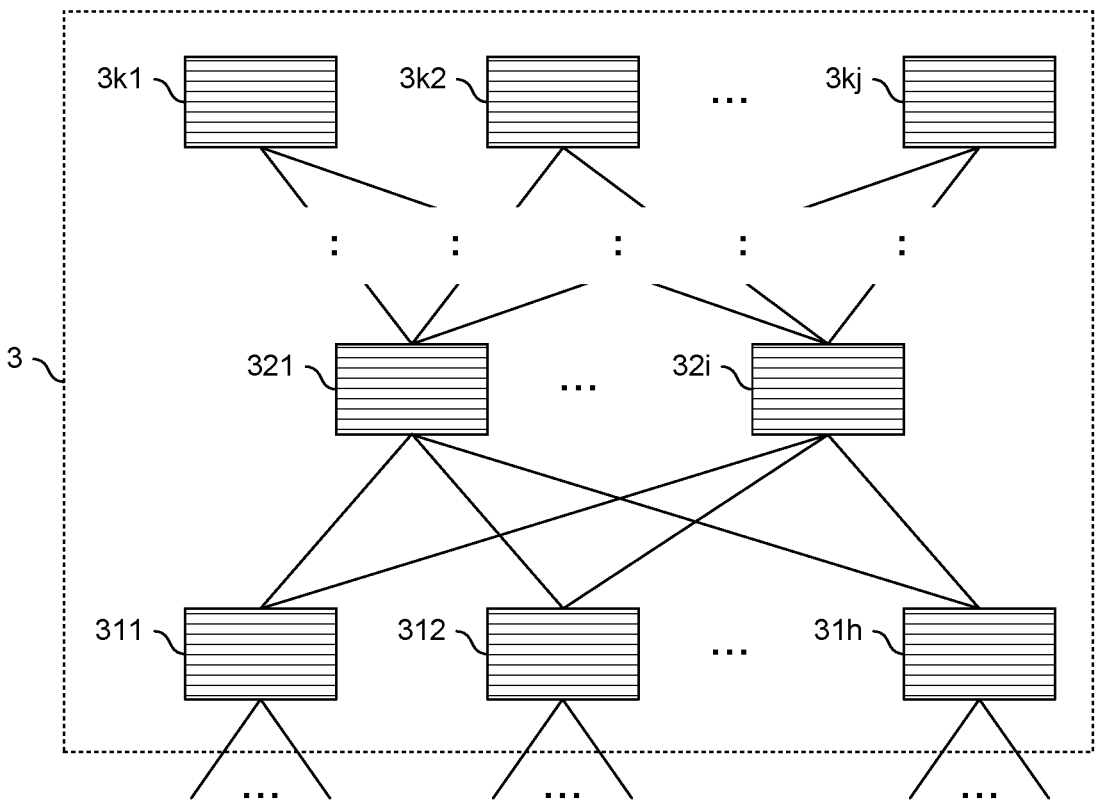
FIG. 2 is a diagram to depict a configuration example of an electric switch unit.

FIG. 2 depicts an example of the configuration of the electric switch unit 3 depicted in FIG. 1. The electric switch unit 3 includes a single or multi-layer electric router or electric packet switch. These are examples of a telecommunication device. For example, h telecommunication devices 311 to 31$h$ connected to the ToR switch unit 2 of the distribution layer are connected to j telecommunication devices 3$k$1 to 3$k$j located at the highest stage k of the electric switch unit 3 by i telecommunication devices 321 to 32$i$. The number of stages k of the electric switch unit 3 and the number h of parallel telecommunication devices located at the lowest stage of the electric switch unit 3 take values of 1 or more. Further, the numbers i and j of parallel telecommunication devices located at a higher position take values of 0 or more.

Figure 3:
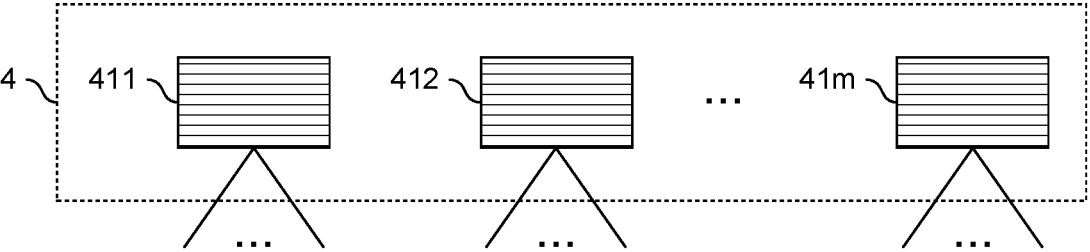
FIG. 3 is a diagram to depict a configuration example of an optical switch unit.

FIG. 3 depicts an example of the configuration of the optical switch unit 4 depicted in FIG. 1. The optical switch unit 4 includes a single or multiple optical line switching switches. An optical line switching switch is an example of an optical communication device. Note that optical communication devices and telecommunication devices are collectively referred to as communication devices. For example, optical line switching switches 411 to 41$m$ are connected to each ToR switch in the ToR switch unit 2 of the distribution layer. Note that the number m of parallel optical line switching switches takes a value of 1 or more. In order to cope with the data center described in Non-Patent Literature 1, an optical line switching switch with about thousand ports is used. For example, an example of a method for constructing a large-scale optical switch is disclosed in Non-Patent Literature 2. Note that the optical line is configured by wavelength multiplexing, time division multiplexing, or both. The optical switch unit 4 may be realized by combining switches with a smaller number of ports in multiple layers, as in the configuration of the electric switch unit 3 depicted in FIG. 2.

Figure 4:
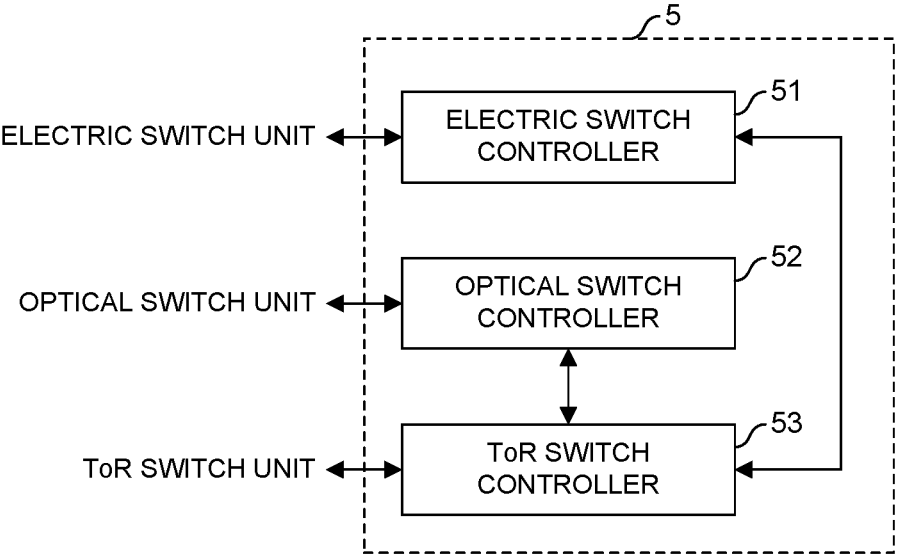
FIG. 4 is a diagram to depict a functional configuration example of a communication control apparatus.

FIG. 4 depicts an example of the configuration of the communication control apparatus 5 depicted in FIG. 1. The communication control apparatus 5 includes an electric switch controller 51, an optical switch controller 52, and a ToR switch controller 53. The electric switch controller 51 is connected to the electric switch unit 3 via the control line 7 for the electric switch unit 3. The optical switch controller 52 is connected to the optical switch unit 4 via the control line 8 for the optical switch unit 4. The ToR switch controller 53 is connected to the ToR switch unit 2 via the control line 9 for the ToR switch unit 2. In the communication control apparatus 5, the electric switch controller 51, the ToR switch controller 53, and the optical switch controller 52 may cooperate to perform control, for example, by exchanging monitored data.

For example, the electric switch controller 51 collects connection information (information regarding the connection state) of the electric switch unit 3 via the control line 7 for the electric switch unit 3, and performs settings on telecommunication devices in the electrical switch unit 3 regarding switching of the electric switch unit 3. Although not used in the present embodiment, the electric switch controller 51 also performs processing of receiving, from each telecommunication device in the electric switch unit 3, data such as data regarding the utilization state of the buffer in the telecommunication device, packet transfer latency, and packet dropout rate and outputting the data to the ToR switch controller 53, for example.

The optical switch controller 52 collects connection information (information regarding the connection state) of the optical switch unit 4 via the control line 8 for the optical switch unit 4, and performs settings on the optical line switching switches in the optical switch unit 4 regarding switching of the optical switch unit 4. Moreover, the optical switch controller 52 detects blocking, for example, based on whether the input/output port of the optical line switching switch that satisfies the optical line setting request from the ToR switch unit 2 is already in use. Furthermore, the optical switch controller 52 calculates a blocking rate obtained by dividing the number of optical line setting requests for which blocking has been detected in a predetermined period by the total number of optical line setting requests within the predetermined period, and outputs the blocking rate to the ToR switch controller 53, for example.

The ToR switch controller 53 collects connection information (information regarding the connection state) of the ToR switch unit 2 via the control line 9 for the ToR switch unit 2, and performs settings on the ToR switches in the ToR switch unit 2. In the present embodiment, the ToR switch controller 53 performs processing to change the flow threshold described below based on the blocking rate obtained from the optical switch controller 52, and performs settings on the ToR switches included in the ToR switch unit 2. Note that although not used in the present embodiment, the ToR switch controller 53 may obtain data regarding the statistical amount of flows transferred from each ToR switch included in the ToR switch unit 2 to the electric switch unit 3. Moreover, the ToR switch controller 53 may obtain data regarding the flow rate of flows being transferred from each ToR switch included in the ToR switch unit 2 via the optical switch unit 4.

The ToR switch according to the present embodiment determines whether to output a flow to any telecommunication device in the electric switch unit 3 or to any optical communication device in the optical switch unit 4 mainly based on the size of the flow, except for flows that are determined to be transferred via the electric switch unit 3 and flows that are determined to be transferred via the optical switch unit 4. At this time, the flow size is compared with the flow threshold. For example, the ToR switch transfers a flow greater than or equal to the flow threshold via the optical switch unit 4 and transfers a flow less than the flow threshold via the electric switch unit 3.

This flow threshold may be fixed, but this may not result in efficient data transfer. For example, if the blocking rate becomes high, even if an attempt is made to transfer a flow via the optical switch unit 4, there is a possibility that an optical line cannot be set up due to blocking, resulting in latency or loss in data transfer. In such a case, by increasing the flow threshold, only flows with a larger size will be transferred via the optical switch unit 4, and thus the blocking rate will decrease. On the other hand, when the blocking rate is low, since it is estimated that there are few flows to be transferred via the optical switch unit 4, the flow threshold is lowered in order to transfer more flows via the optical switch unit 4. In this way, the load on the electric switch unit 3 can be reduced by effectively utilizing the optical switch unit 4, and the latency performance and efficiency as a whole can be improved.

Figure 5:
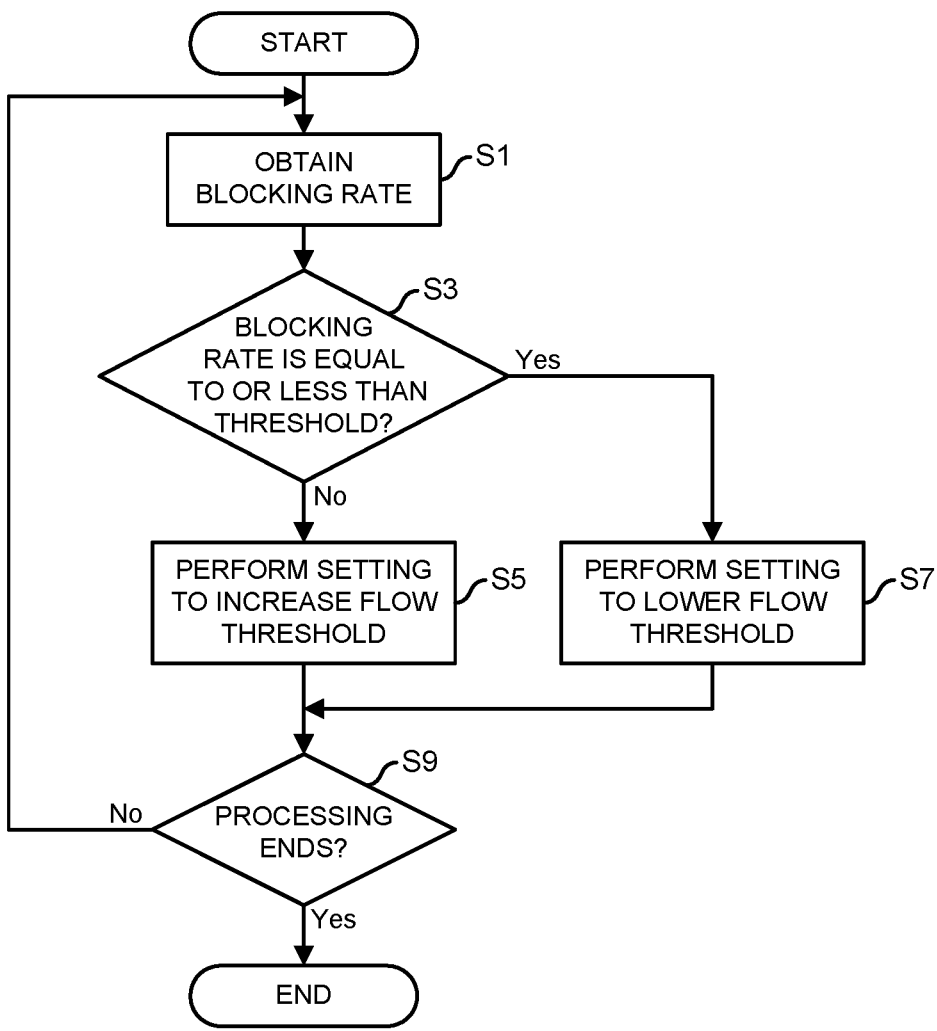
FIG. 5 is a diagram to depict a processing flow relating to a first embodiment.

For example, the ToR switch controller 53 executes the processing depicted in FIG. 5, for example. For example, steps S1 to S9 are executed at predetermined time intervals.

The ToR switch controller 53 obtains the blocking rate from the optical switch controller 52, for example (step S1). Then, the ToR switch controller 53 compares the blocking rate with a threshold determined in advance for the blocking rate, and determines whether the blocking rate is less than or equal to the threshold (step S3). When the blocking rate exceeds the threshold, the ToR switch controller 53 performs settings on each ToR switch of the ToR switch unit 2 to increase the current flow threshold by a predetermined value in order to suppress the occurrence of further blocking (step S5). With this, in the ToR switch, only flows with a larger size are transferred via the optical switch unit 4, so it is expected that the blocking rate will decrease. The processing then proceeds to step S9.

On the other hand, when the blocking rate is equal to or less than the threshold, in order to increase the flow transfer via the optical switch unit 4, the ToR switch controller 53 performs settings on each ToR switch to lower the current flow threshold by a predetermined value (step S7). As a result, in the ToR switch, even flows with a smaller size can be transferred via the optical switch unit 4.

Then, the ToR switch controller 53 determines whether or not the processing is to be terminated due to, for example, an instruction to stop changing the flow threshold based on the blocking rate or a power outage (step S9). The processing returns to step S1 if the processing is not to be terminated, and the processing ends if the processing is to be terminated.

By repeating such processing, an appropriate flow threshold is dynamically set in accordance with temporal changes in the blocking rate.

In such processing, the same flow threshold is set for each ToR switch, but a different flow threshold may be set for each ToR switch. This is because the ToR switches may have different models and therefore have different performances, and the configurations and processing conditions of the servers in charge may also differ. For example, the processing flow in FIG. 5 may be executed for each ToR switch by calculating the blocking rate for each ToR switch. Furthermore, the flow threshold set for each ToR switch may be changed by changing the predetermined value in step S5 or step S7 in the processing flow of FIG. 5 for each ToR switch. Furthermore, although one flow threshold is calculated, it may be adjusted for each ToR switch. Note that the communication control apparatus 5 including the ToR switch controller 53 manages the flow thresholds set in each ToR switch.

In the example described above, the ToR switch controller 53 changes the flow threshold and sets it for each ToR switch, but when changing the flow threshold for each ToR switch, the ToR switch may change the flow threshold. Moreover, although an example has been indicated in which the ToR switch controller 53 changes the flow threshold, other units of the communication control apparatus 5 may change the flow threshold and the ToR switch controller 53 may perform the setting.

Embodiment 2

The overall efficiency may be improved by dynamically changing the flow threshold based on the load on the electric switch unit 3. In the present embodiment, as one of the indicators representing the load on the electric switch unit 3, the statistical amount of the utilization state (for example, utilization rate) of the packet buffer of the telecommunication device included in the electric switch unit 3 is employed. The statistical amount is, for example, an average value, a median value, a maximum value, and the like.

Figure 6:
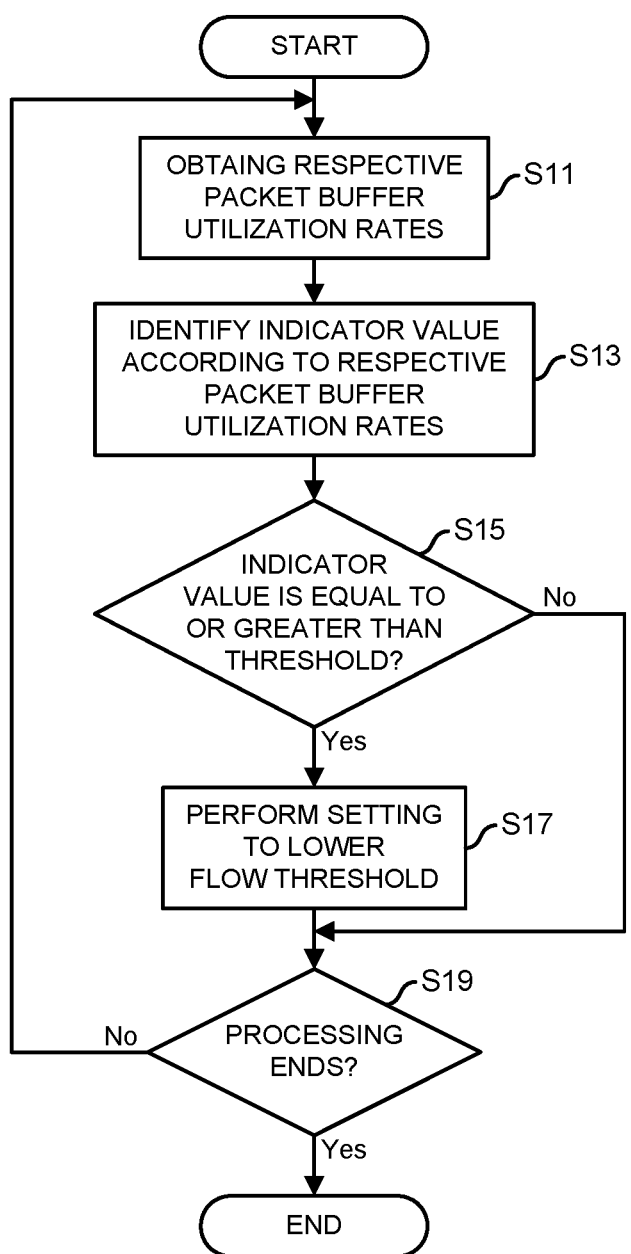
FIG. 6 is a diagram to depict a processing flow relating to a second embodiment.

More specifically, the ToR switch controller 53, for example, executes processing depicted in FIG. 6. For example, steps S11 to S19 are executed at predetermined time intervals.

The electric switch controller 51 obtains the utilization rate of packet buffers (packet buffer utilization rate) of each electric communication device in the electric switch unit 3 from the telecommunication device and the ToR switch controller 53 obtains the packet buffer utilization rate of each telecommunication device from the electric switch controller 51 (step S11). The ToR switch controller 53 identifies the statistical amount of the packet buffer utilization rate as an indicator value according to the packet buffer utilization rates of respective telecommunication devices (step S13).

Then, the ToR switch controller 53 compares the identified indicator value with a threshold determined in advance for the indicator value, and determines whether the indicator value is equal to or greater than the threshold (step S15). If the indicator value is greater than or equal to the threshold, the ToR switch controller 53 performs settings on each ToR switch to lower the flow threshold by a predetermined value, for example, so that the packet buffer utilization rate does not increase further (step S17). That is, settings are made to increase the use of the optical switch unit 4. The processing then proceeds to step S19. On the other hand, if the indicator value is less than the threshold, the processing proceeds to step S19 without performing any particular processing.

Then, the ToR switch controller 53 determines whether or not to terminate the processing due to, for example, an instruction to stop changing the flow threshold based on the indicator value according to the bucket buffer utilization rates or a power outage (step S19). The processing returns to step S11 if the processing is not to be terminated, and the processing ends if the processing is to be terminated.

By repeating such processing, an appropriate flow threshold is dynamically set in accordance with temporal changes in the utilization state of the packet buffer, such as the packet buffer utilization rate.

In such processing, the same flow threshold is set for each ToR switch, but a different flow threshold may be set for each ToR switch. This is because the ToR switches may have different models and therefore have different performances, and the configurations and processing conditions of the servers in charge may also differ. For example, the flow threshold set for each ToR switch may be changed by changing the predetermined value in step S17 in the processing flow of FIG. 6 for each ToR switch. Furthermore, although one flow threshold is calculated in step S17, it may be adjusted for each ToR switch. Note that the communication control apparatus 5 including the ToR switch controller 53 manages the flow thresholds set in each ToR switch.

In the example described above, the ToR switch controller 53 changes the flow threshold and sets it for each ToR switch, but when changing the flow threshold for each ToR switch, the ToR switch may change the flow threshold notified from the ToR switch controller 53. Furthermore, in FIG. 6, the flow threshold is not changed when the indicator value is less than the threshold, but the setting to increase the flow threshold may be performed.

Moreover, although an example has been indicated in which the ToR switch controller 53 changes the flow threshold, other units of the communication control apparatus 5 may change the flow threshold and the ToR switch controller 53 may perform the setting.

Embodiment 3

Regarding the load on the electric switch unit 3, not only the packet buffer utilization rate of the telecommunication device described in the second embodiment, but also the statistical amount regarding the flows that each ToR switch of the ToR switch unit 2 transfers to the electric switch unit 3, specifically, the amount of traffic within a certain period of time due to all flows transferred to the electric switch unit 3 may also be used.

Figure 7:
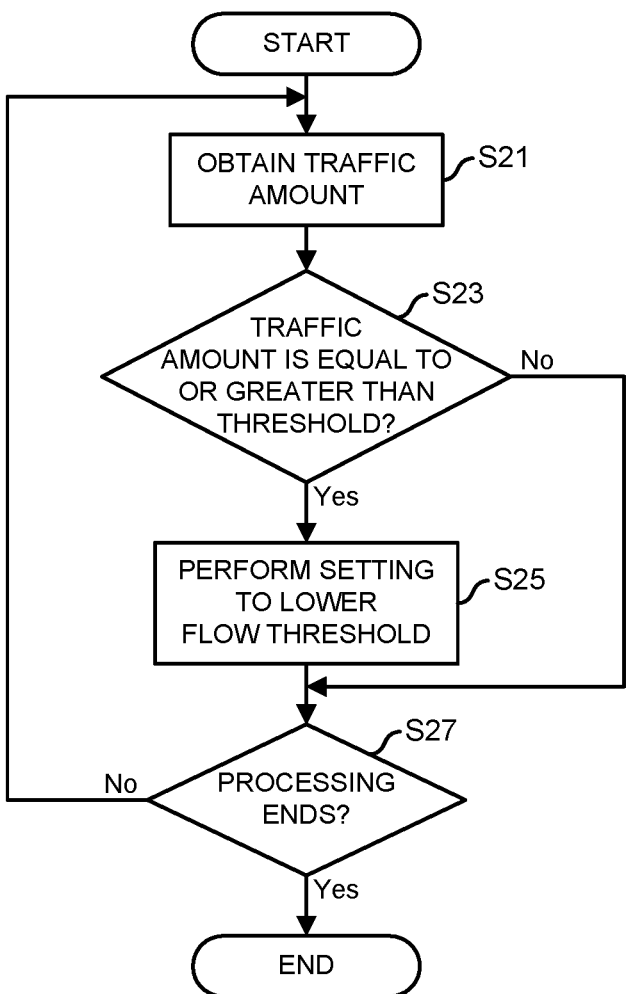
FIG. 7 is a diagram to depict a processing flow relating to a third embodiment.

More specifically, the ToR switch controller 53, for example, executes the processing depicted in FIG. 7. For example, steps S21 to S27 are executed at predetermined time intervals. Note that in the present embodiment, the processing depicted in FIG. 7 is executed for each ToR switch included in the ToR switch unit 2.

The ToR switch controller 53 obtains, from a certain ToR switch, the amount of traffic (traffic amount) transferred by the certain ToR switch to the electric switch unit 3 within a certain period of time (step S21). Then, the ToR switch controller 53 determines whether or not the traffic amount is equal to or greater than a threshold determined in advance for the traffic amount (step S23). If the traffic amount is equal to or greater than the threshold, settings are made to the ToR switch that measured the traffic amount to lower the flow threshold by a predetermined value, for example, to prevent the traffic amount from increasing any further and increasing the load on the electric switch unit 3 (step S25). The processing then proceeds to step S27. On the other hand, if the traffic amount is less than the threshold, the processing proceeds to step S27 without performing any particular processing.

Then, the ToR switch controller 53 determines whether or not to terminate the processing due to, for example, an instruction to stop changing the flow threshold based on the indicator value corresponding to the traffic amount or a power outage (step S27). The processing returns to step S21 if the processing is not to be terminated, and the processing ends if the processing is to be terminated.

By repeating such processing, an appropriate flow threshold is dynamically set in accordance with temporal changes in the flow statistical amount such as a traffic amount.

Although an example has been indicated in which the ToR switch controller 53 changes the flow threshold for each ToR switch, each ToR switch itself may change the flow threshold. On the other hand, the same flow threshold may be determined for each ToR switch by calculating the statistical amount (for example, average value, median value, maximum value, and the like) of the traffic amounts obtained from respective ToR switches. Note that the communication control apparatus 5 including the ToR switch controller 53 manages the flow thresholds set in each ToR switch. When each ToR switch determines the flow threshold, the ToR switch controller 53 is notified of the determined flow threshold.

Moreover, in FIG. 7, the flow threshold is not changed when the indicator value is less than the threshold, but the flow threshold may be set to be increased.

Furthermore, although an example has been indicated in which the ToR switch controller 53 changes the flow threshold, other units of the communication control apparatus 5 may change the flow threshold and the ToR switch controller 53 may perform the setting.

Embodiment 4

As for the load on the electric switch unit 3, the packet transfer latency or packet dropout rate in each telecommunication device within the electric switch unit 3 may be used.

Figure 8:
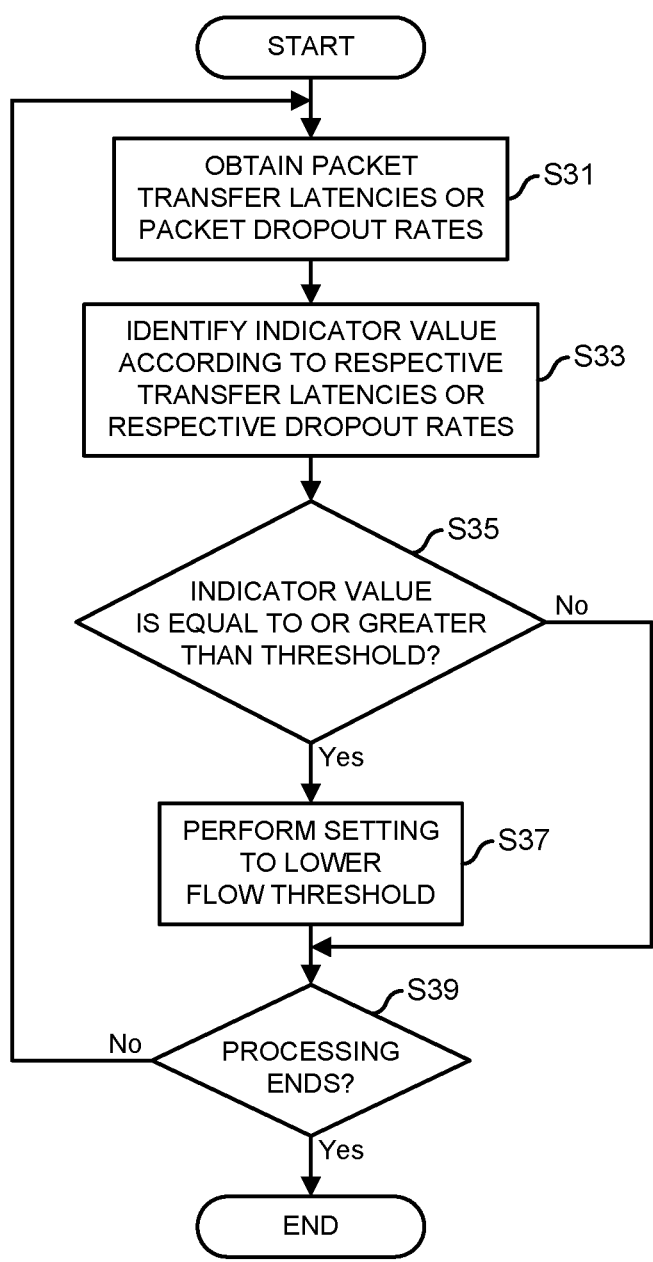
FIG. 8 is a diagram to depict a processing flow relating to a fourth embodiment.

More specifically, the ToR switch controller 53, for example, executes the processing depicted in FIG. 8. For example, steps S31 to S39 are executed at predetermined time intervals.

The electric switch controller 51 obtains the packet transfer latency or packet dropout rate in the telecommunication device from each telecommunication device in the electric switch unit 3, and the ToR switch controller 53 obtains the packet transfer latency or packet dropout rate in each telecommunication device from the electric switch controller 51 (step S31). The ToR switch controller 53 identifies a statistical amount of packet transfer latencies or packet dropout rates as an indicator value according to the packet transfer latencies or packet dropout rates in respective telecommunication devices (step S33). The statistical amount is, for example, an average value, a median value, a maximum value, or the like.

Then, the ToR switch controller 53 compares the identified indicator value with a threshold determined in advance for the indicator value, and determines whether or not the indicator value is equal to or greater than the threshold (step S35). When the indicator value is greater than or equal to the threshold, the ToR switch controller 53 performs settings on each ToR switch to lower the flow threshold by a predetermined value, for example, so that the packet transfer latency or packet dropout rate does not increase further (step S37). That is, settings are made to increase the use of the optical switch unit 4. The processing then proceeds to step S39. On the other hand, if the indicator value is less than the threshold, the processing proceeds to step S39 without performing any particular processing.

Then, the ToR switch controller 53 determines whether or not to terminate the processing due to, for example, an instruction to stop changing the flow threshold based on this indicator value or a power outage (step S39). The processing returns to step S31 if the processing is not to be terminated and the processing ends if the processing is to be terminated.

By repeating such processing, an appropriate flow threshold is dynamically set according to time changes in the statistical amount of packet transfer latencies or packet dropout rates.

In such processing, the same flow threshold is set for each ToR switch, but a different flow threshold may be set for each ToR switch. This is because the ToR switches may have different models and therefore have different performances, and the configurations and processing conditions of the servers in charge may also differ. For example, the flow threshold set for each ToR switch may be changed by changing the predetermined value in step S37 in the processing flow of FIG. 8 for each ToR switch. Furthermore, although one flow threshold is calculated in step S37, it may be adjusted for each ToR switch. Note that the communication control apparatus 5 including the ToR switch controller 53 manages the flow thresholds set in each ToR switch.

In the example described above, the ToR switch controller 53 changes the flow threshold and sets it for each ToR switch, but when changing the flow threshold for each ToR switch, the ToR switch may change the flow threshold notified from the ToR switch controller 53. Furthermore, in FIG. 8, the flow threshold is not changed when the indicator value is less than the threshold, but the flow threshold may be set to be increased.

Further, although an example has been indicated in which the ToR switch controller 53 changes the flow threshold, other units of the communication control apparatus 5 may change the flow threshold and the ToR switch controller 53 may perform the setting.

Embodiment 5

In the embodiment described above, data transfer in the electro-optical hybrid switch network is made more efficient by adjusting the flow threshold, but even if an optical line is set up in the optical line switching network, the overall efficiency cannot be achieved unless the optical line is used effectively. In other words, if the flow rate (for example, the number of bytes transmitted per unit time) of flows flowing through the set optical line is less than the threshold, the optical line is not used effectively, and it is more efficient to disconnect such an optical line so that other optical lines can be set up. From this point of view, the following processing is performed.

Figure 9:
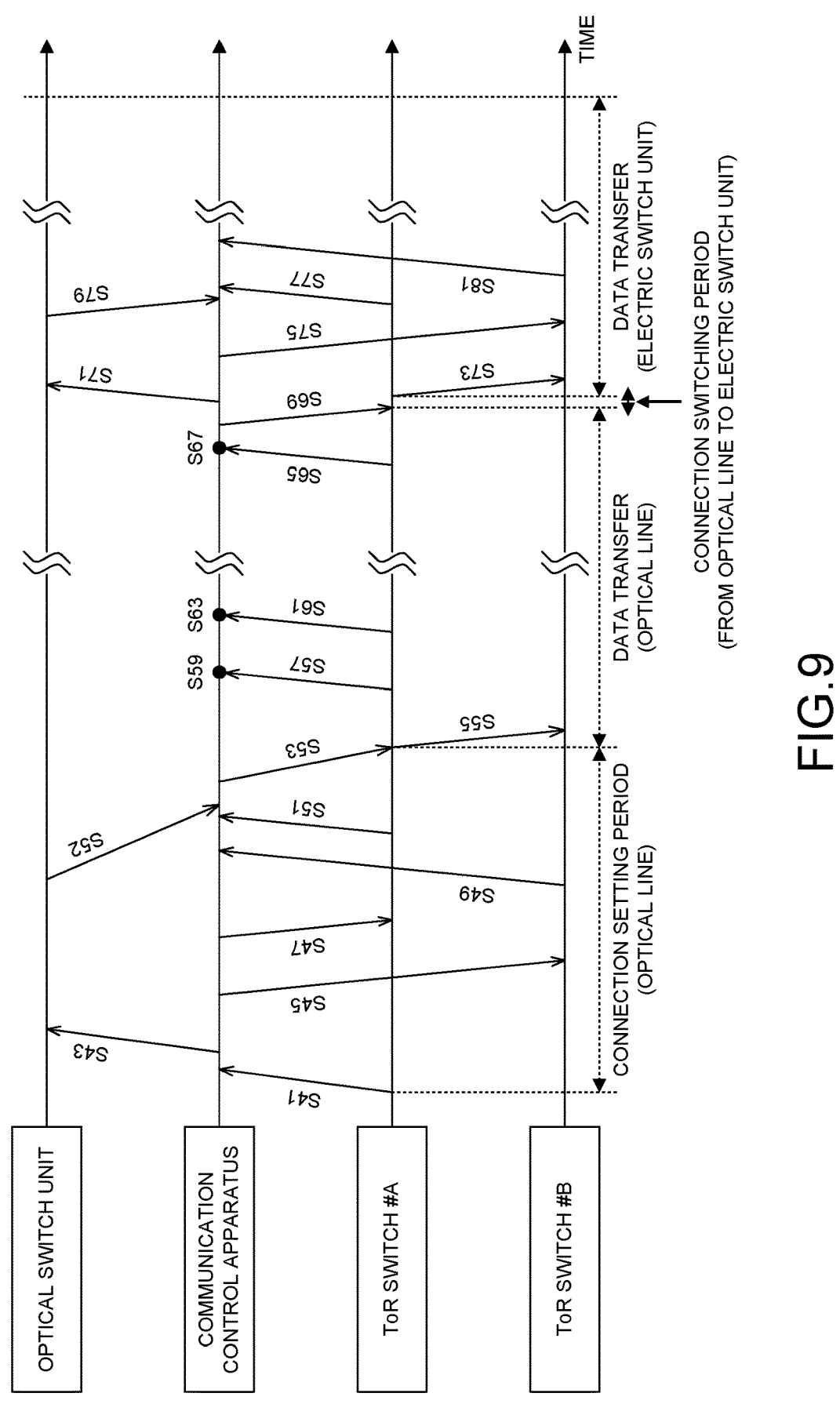
FIG. 9 is a diagram to depict a processing sequence relating to a fifth embodiment.

The specific processing contents will be explained using FIG. 9. Note that a case where data is transferred from ToR switch #A to ToR switch #B will be described as an example.

First, when the ToR switch #A determines that data is to be transferred via the optical line switching network, that is, the optical switch unit 4, the ToR switch #A transmits an optical line setting request to the communication control apparatus 5 requesting an optical line to be set up between the ToR switch #A and the ToR switch #B (step S41). Regarding whether or not to transfer data via the optical line switching network, as with the premise of the first to fourth embodiments, it may be determined whether the flow has a size exceeding the flow threshold, and it may be determined that data is to be transferred via the optical line switching network if the flow has a size exceeding the flow threshold. However, it may be determined to transfer data via the optical line switching network based on other criteria.

The optical switch controller 52 of the communication control apparatus 5 transmits a connection setting request to an associated optical communication device in the optical switch unit 4 in response to the optical line setting request (step S43). Furthermore, the communication control apparatus 5 transmits an optical line connection setting request to the ToR switch #B (step S45). Furthermore, the communication control apparatus 5 transmits a transmission connection request to the ToR switch #A requesting optical line setup and data transmission (step S47).

The ToR switch #B performs optical line connection settings in response to the optical line connection setting request, and returns a reception permission notification to the communication control apparatus 5 (step S49). Moreover, in response to the transmission connection request, the ToR switch #A performs optical line connection settings to prepare for data transmission, and returns a transmission permission notification to the communication control apparatus 5 (step S51). Furthermore, the associated optical communication device in the optical switch unit 4 performs connection settings in response to the connection setting request, and transmits a connection completion notification to the communication control apparatus 5 (step S52). In this way, upon receiving the responses from the ToR switch #B, the ToR switch #A, and the optical switch unit 4, the communication control apparatus 5 transmits a data transmission command to the ToR switch #A (step S53). Steps S41 to S53 correspond to the connection setting period of the optical line.

Upon receiving the transmission command from the communication control apparatus 5, the ToR switch #A starts transmitting data to the ToR switch #B via the set optical line (step S55). Note that the ToR switch #A measures the flow rate of the flow flowing through the set optical line, and transmits the flow rate to the communication control apparatus 5, for example, at predetermined time intervals (steps S57, S61 and S65). On the other hand, for example, when the ToR switch controller 53 of the communication control apparatus 5 receives the flow rate from the ToR switch #A, the ToR switch controller 53 determines whether or not the flow rate is equal to or less than a threshold determined in advance for the flow rate (steps S59, S63 and S67). If the flow rate exceeds the threshold, it is assumed that the set optical line is being effectively utilized, and the optical line remains in the set state. In this example, it is assumed that in steps S59 and S63, it is determined that the flow rate exceeds the threshold.

On the other hand, in this example, in step S67, it is assumed that it is determined that the flow rate has become equal to or less than the threshold. Then, in order to disconnect the set optical line, the communication control apparatus 5 transmits an optical line release request to the ToR switch #A (step S69). The period up to this is corresponds to the period for data transfer via the optical line.

When the ToR switch #A receives the optical line release request, since there is still data to be transmitted, the ToR switch #A starts transmitting data via the electric switch unit 3 (that is, the electric packet network) (step S73). The period from step S69 until the ToR switch #A starts transmitting data via the electric switch unit 3 corresponds to the connection switching period, and the period after from step S73 corresponds to the period for data transfer via the electric switch unit 3. Note that a description of the settings for the electric switch unit 3 is omitted.

On the other hand, the communication control apparatus 5 transmits an optical line connection release request to the associated optical communication device in the optical switch unit 4 (step S71). Moreover, the communication control apparatus 5 transmits an optical line connection release request to the ToR switch #B (step S75). In response to this, the ToR switch #A performs processing to disconnect the optical line, and transmits an optical line release notification to the communication control apparatus 5 (step S77). Moreover, the associated optical communication device in the optical switch unit 4 performs processing to release the set optical line and transmits a connection release notification to the communication control apparatus 5 (step S79). Furthermore, the ToR switch #B performs processing to disconnect the optical line, and transmits an optical line release notification to the communication control apparatus 5 (step S81). By starting data transmission via the electric packet network before the optical line is disconnected, it is possible to suppress the latency to the minimum.

By executing such processing, it is possible to determine whether or not to continue the connection of an already set optical line based on the flow rate of the flow flowing through the optical line, and if the flow rate of the flow flowing through the optical line is equal to or less than the threshold, the optical line is disconnected and data is transferred via the electric packet network. By doing so, the optical line switching network can be effectively utilized. Note that even if there is a sufficient flow rate at the beginning, a situation may occur in which the flow rate decreases thereafter, so it is possible to cope with such a temporal change in the flow rate.

Other Technical Elements

As a method for detecting the blocking, for example, a method can be conceived to determine that the blocking has occurred if the input/output port of the optical line switching switch that satisfies the optical line setting request from the ToR switch unit 2 is already in use. For example, the optical switch controller 52 manages the connection state of each optical switch (optical communication device) using a table as depicted in FIG. 10. FIG. 10 depicts the connection state of one optical line switching switch in the optical switch unit 4, where the number of input ports is P and the number of output ports is Q. Note that the connection state indicates whether the connection is possible or not for each combination of input/output ports. If the connections of the number of input ports P and the number of output ports Q are not possible (x) in all the optical line switching switches (optical communication devices) in the optical switch unit 4 in FIG. 3, the setting of the optical line between specific ToR switches is blocked.

In the example in FIG. 10, each row corresponds to an input port and each column corresponds to an output port, and pairs of input/output ports that can be connected are marked with a circle (○), and pairs of input/output ports that are already connected or cannot be connected due to exclusion are marked with a cross mark (x) or a minus mark (−). Note that, here, pairs of input and output ports with the same number are excluded (−). In this example, input port 2 and output port 1, and input port P and output port 3 are already connected, and the pairs related to these input and output ports are marked with a cross mark (x), which represents they are already connected, or minus mark (−). In this manner, in the present embodiment, the connection state of the optical switch unit 4 can be confirmed by simply managing and referring to the table such as that depicted in FIG. 10, without managing the connection state of the entire network. The conventional technologies depicted in Patent Literature 1 and Non-Patent Literature 2 mentioned above check the usability of all telecommunication devices and optical communication devices connected to the electro-optical hybrid switch network, and determine the presence or absence of blocking, and whether lines can be set. Therefore, the present embodiment enables simpler control with lower latency than the conventional technology.

Other Embodiments

Figure 11:
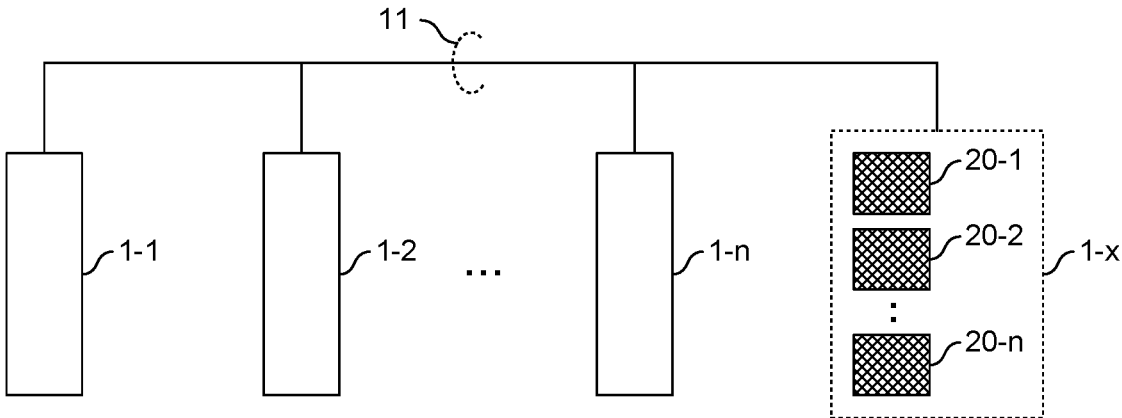
FIG. 11 is a diagram to depict another example of a rack configuration.
Figure 12:
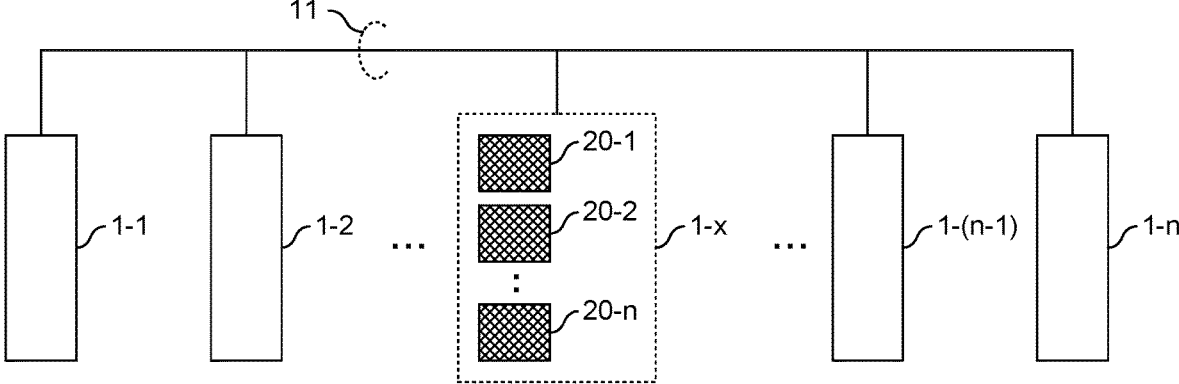
FIG. 12 is diagram to depict yet another example of the rack configuration.

The embodiments described above have been described on the premise that a ToR switch is installed in each rack as depicted in FIG. 1. However, the present invention is not limited thereto. For example, as depicted in FIG. 11, a rack 1-*x* including connection devices 20-1 to 20-*n* each having a function equivalent to a ToR switch may be arranged in parallel with the racks 1-1 to 1-*n* and at the end of the racks 1-1 to 1-*n*, in which one or more servers, memory, and the like are arranged. The racks 1-1 to 1-*n* are connected to the connection devices 20-1 to 20-*n* via electric links or optical links 11. This is called an End-of-row configuration. Furthermore, as depicted in FIG. 12, a Middle-of-row configuration may be adopted in which the rack 1-*x* is placed in the middle of the racks 1-1 to 1-*n*. In either case, it may be a one-to-one relationship, such as the connection device 20-1 being in charge of the rack 1-1 and the connection device 20-2 being in charge of the rack 1-2, one connection device 20 may be in charge of one or more racks. In some cases, a server, memory, and the like that each connection device 20 is in charge of may be set regardless of the rack.

That is, the connection devices 20-1 to 20-*n*, which have functions equivalent to ToR switches, also cooperate with the communication control apparatus 5 to realize the electro-optical hybrid switch network that enables low-latency data transfer as described above.

Although the embodiments of the present invention were explained above, this invention is not limited to those. For example, the functional configuration example of the communication control apparatus 5 is a mere example, and may not correspond to the program module configuration. In addition, as for the processing flows and operational sequence, as long as the processing results do not change, the order of steps may be swapped or plural steps may be executed in parallel.

Moreover, combinations of the embodiments or combinations of arbitrary technical features in respective embodiments may be performed, as needed, according to its object.

Figure 13:
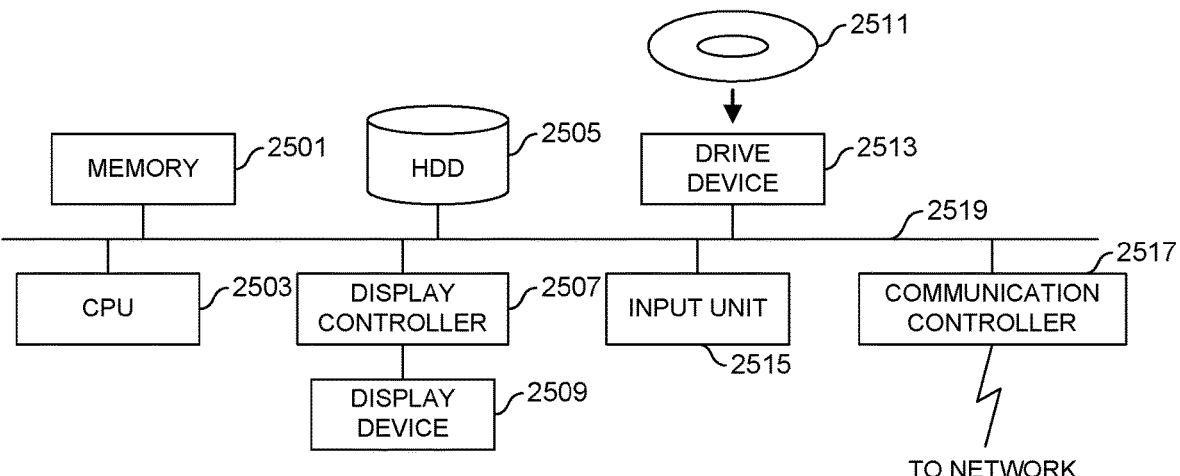
FIG. 13 is a block configuration diagram of a computer apparatus that is the communication control apparatus.

The aforementioned communication control apparatus 5 is, for example, a computer apparatus, and as illustrated in FIG. 13, a memory 2501, Central Processing Unit (CPU) 2503, a Hard Disk Drive (HDD) 2505, a display controller 2507 connected to a display device 2509, a drive device 2513 for a removable disk 2511, an input unit 2515, and a communication controller 2517 for connection with a network are connected through a bus 2519. Note that the HDD may be a storage device such as a Solid State Drive (SSD). An operating system (OS) and an application program for performing the processing in the embodiments, are stored in the HDD 2505, and when executed by the CPU 2503, they are read out from the HDD 2505 to the memory 2501. According to processing contents of the application program, the CPU 2503 controls the display controller 2507, the communication controller 2517, and the drive device 2513, and causes them to perform predetermined operations. Moreover, intermediate processing data is stored mainly in the memory 2501, however, it may be stored in the HDD 2505. For example, the application program to perform the aforementioned processing is stored in the computer-readable removable disk 2511 and distributed, and then it is installed into the HDD 2505 from the drive device 2513. It may be installed into the HDD 2505 via the network such as the Internet and the communication controller 2517. In the computer apparatus as mentioned above, the hardware such as the CPU 2503 and the memory 2501, programs such as the OS and the application programs systematically cooperate with each other, so that various functions as described above in details are realized.

Not only the communication control apparatus 5 may be implemented in one apparatus, but also functions of the communication control apparatus 5 may be distributedly implemented in plural apparatuses. Moreover, a part of functions of the electric switch controller 51, optical switch controller 52 and/or ToR switch controller 53 may be distributedly located in the electric switch unit 3, optical switch unit 4 and ToR switch unit 2. Furthermore, the CPU may be Graphics Processing Unit (GPU), Field-Programmable Gate Array (FPGA) or the like.

The aforementioned embodiments are outlined as follows.

A communication control method relating to a first aspect of the embodiments is a communication control method for controlling communication between connection apparatuses that are connected through an optical line switching network and through an electric packet network, each of the connection apparatuses responsible for one or plural devices, the communication control method includes: (A) a step of obtaining monitor data that is a blocking rate at optical line setup in the optical line switching network, an amount concerning flows transferred by the connection apparatus (e.g. any one or each of the connection apparatuses) to the electric packet network, a buffer utilization state in telecommunication devices within the electric packet network, or packet transfer latency or a packet dropout rate in telecommunication devices within the electric packet network; and (B) a step of changing, based on the monitor data, a first threshold (e.g. the flow threshold in the embodiments) for distinguishing a first flow to be transferred by the connection apparatuses through the optical line switching network from a second flow to be transferred by the connection apparatuses through the electric packet network, wherein the first threshold is to identify, as the first flow, a flow that has a size exceeding the first threshold and identify, as the second flow, a flow that has a size that is equal to or less than the first threshold.

By changing the first threshold based on the monitor data, flows can be appropriately transferred from the connection apparatus according to status of the optical line switching network or electric packet network. Therefore, as a whole, data transfer can be efficiently performed. Note that the first threshold after the change or a value determined based on that first threshold (e.g. a value adjusted for individual connection apparatus) may be set for the connection apparatus.

In the aforementioned communication control method, the first threshold may be lowered in case where the blocking rate is less than a second threshold defined for the blocking rate. The low blocking rate means that the flows to be transferred through the optical line switching network are less, and by lowering the first threshold, the flows to be transferred through the optical line switching network is increased to improve the efficiency as a whole.

Moreover, the aforementioned communication method, the first threshold may be increased in case where the blocking rate is equal to or greater than a second threshold defined for the blocking rate. The high blocking rate means that there are a lot of flows to be transferred through the optical line switching network, and by increasing the threshold, the flows to be transferred through the optical line switching network is decreased to improve the efficiency as a whole.

Furthermore, in the aforementioned communication control method, the amount concerning the flows may be an amount of traffic transferred by any one of the connection apparatuses to the electric packet network within a prescribed period. In such a case, if the amount of traffic exceeds a third threshold defined for the amount of traffic, the first threshold for the any one of the connection apparatuses may be lowered so that the amount of traffic becomes equal to or less than the third threshold.

Furthermore, in the aforementioned communication control method, the amount concerning the flows may be a statistical amount of amounts of traffic, each transferred by any one of the connection apparatuses to the electric packet network. In such a case, if the statistical amount of the amounts of traffic exceeds a third threshold defined for the statistical amount of the amounts of traffic, the first threshold for each of the connection apparatuses may be lowered so that the statistical amount of the amounts of traffic becomes equal to or less than the third threshold.

Moreover, in the aforementioned communication control method, if an indicator value according to the buffer utilization state is equal to or greater than a fourth threshold predefined for the indicator value, the first threshold may be lowered so that the indicator value becomes less than the fourth threshold. The fact that a lot of buffers in the telecommunication device are used means that the load of the electric packet network is high. Therefore, when lowering the first threshold and flowing a lot of flows into the optical line switching network, it is possible to lower the load of the electric packet network. Thereby, the efficiency can be improved as a whole.

Furthermore, in the aforementioned communication method, if an indicator value according to the packet transfer latency or the packet dropout rate is equal to or greater than a fifth threshold predefined for the indicator value, the first threshold may be lowered so that the indicator value becomes less than the fifth threshold.

The packet transfer latency or packet dropout rate is also an indicator value representing the load of the electric packet network, and if the load of the electric packet network is high, the first threshold is adjusted so as to lower the load.

Moreover, the aforementioned communication control method may further include: a step of determining whether or not a flow rate of a flow that is transferred through an optical line set between certain connection apparatuses in the optical line switching network is equal to or less than a sixth threshold; and if the flow rate of the flow is equal to or less than the sixth threshold, a step of causing to disconnect the optical line and causing a flow transmission source of the certain connection apparatuses to transmit packets relating to the flow through the electric packet network. Although it is assumed that the flow with a large size is flowed through the optical line switching network, the optical line is used needlessly when the flow rate of the flow is equal to or less than the threshold. Therefore, by disconnecting the optical line and transferring the flow through the electric packet network, the efficiency is improved as a whole.

A communication control method according to a second aspect of the embodiments is a communication control method for controlling communication between connection apparatuses that are connected through an optical line switching network and through an electric packet network, each of the connection apparatuses responsible for one or plural devices, the communication control method includes: (A) a step of determining whether or not a flow rate of a flow that is transferred through an optical line set between certain connection apparatuses in the optical line switching network is equal to or less than a threshold; and (B) in case where the flow rate of the flow is equal to or less than the threshold, a step of causing to disconnect the optical line and causing a flow transmission source of the certain connection apparatuses to transmit packets relating to the flow through the electric packet network.

It is possible to create a program for causing a computer to execute the aforementioned method, and its program may be recorded in various storage medium.

The invention claimed is:

1. A communication control method for controlling communication between connection apparatuses, the communication control method comprising:

obtaining monitor data that is a blocking rate at optical line setup in an optical line switching network, an amount concerning flows transferred by a connection apparatus to an electric packet network, a buffer utilization state in telecommunication devices within the electric packet network, or packet transfer latency or a packet dropout rate in telecommunication devices within the electric packet network, wherein the connection apparatuses are connected through the optical line switching network and through the electric packet network, and each of the connection apparatuses is responsible for one or a plurality of devices; and changing, based on the monitor data, a first threshold for distinguishing a first flow to be transferred by the connection apparatus through the optical line switching network from a second flow to be transferred by the connection apparatus through the electric packet network, wherein the first threshold is to identify, as the first flow, a flow that has a size exceeding the first threshold and identify, as the second flow, a flow that has a size that is equal to or less than the first threshold.

2. The communication control method according to claim 1, wherein the first threshold is lowered in case where the blocking rate is less than a second threshold defined for the blocking rate.

3. The communication control method according to claim 1, wherein the first threshold is increased in case where the blocking rate is equal to or greater than a second threshold defined for the blocking rate.

4. The communication control method according to claim 1, wherein the amount concerning the flows is an amount of traffic transferred by any one of the connection apparatuses to the electric packet network within a prescribed period, and in case where the amount of traffic exceeds a third threshold defined for the amount of traffic, the first threshold for the any one of the connection apparatuses is lowered so that the amount of traffic becomes equal to or less than the third threshold.

5. The communication control method according to claim 1, wherein the amount concerning the flows is a statistical amount of amounts of traffic, each transferred by any one of the connection apparatuses to the electric packet network, and in case where the statistical amount of the amounts of traffic exceeds a third threshold defined for the statistical amount of the amounts of traffic, the first threshold for each of the connection apparatuses is lowered so that the statistical amount of the amounts of traffic becomes equal to or less than the third threshold.

6. The communication control method according to claim 1, wherein, in case where an indicator value according to the buffer utilization state is equal to or greater than a fourth threshold predefined for the indicator value, the first threshold is lowered so that the indicator value becomes less than the fourth threshold.

7. The communication control method according to claim 1, wherein, in case where an indicator value according to the packet transfer latency or the packet dropout rate is equal to or greater than a fifth threshold predefined for the indicator value, the first threshold is lowered so that the indicator value becomes less than the fifth threshold.

8. The communication control method according to claim 1, further comprising:

a determining whether a flow rate of a flow that is transferred through an optical line set between certain connection apparatuses in the optical line switching network is equal to or less than a sixth threshold; and in case where the flow rate of the flow is equal to or less than the sixth threshold, causing to disconnect the optical line and causing a flow transmission source of the certain connection apparatuses to transmit packets relating to the flow through the electric packet network.

9. A communication control method for controlling communication between connection apparatuses, the communication control method comprising:

determining whether a flow rate of a flow that is transferred through an optical line set between the connection apparatuses in an optical line switching network is equal to or less than a threshold, wherein the connection apparatuses are connected through the optical line switching network and through an electric packet network, and each of the connection apparatuses is responsible for one or a plurality of devices; and in case where the flow rate of the flow is equal to or less than the threshold, causing to disconnect the optical line and causing a flow transmission source of the connection apparatuses to transmit packets relating to the flow through the electric packet network.

10. A communication control apparatus for controlling communication between connection apparatuses, the communication control apparatus comprising:

a processor; and a memory including computer program code, where the memory and the computer program code are configured, with the processor, to cause the communication control apparatus to:

obtain monitor data that is a blocking rate at optical line setup in an optical line switching network, an amount concerning flows transferred by the connection apparatuses to an electric packet network, a buffer utilization state in telecommunication devices within the electric packet network, or packet transfer latency or a packet dropout rate in telecommunication devices within the electric packet network, wherein the connection apparatuses are connected through the optical line switching network and through the electric packet network, and each of the connection apparatuses is responsible for one or a plurality of devices; and change, based on the monitor data, a first threshold for distinguishing a first flow to be transferred by the connection apparatus through the optical line switching network from a second flow to be transferred by the connection apparatus through the electric packet network, wherein the first threshold is to identify, as the first flow, a flow that has a size exceeding the first threshold and identify, as the second flow, a flow that has a size that is equal to or less than the first threshold.

11. A communication control apparatus for controlling communication between connection apparatuses, the communication control apparatus comprising:

a processor; and a memory including computer program code, where the memory and the computer program code are configured, with the processor, to cause the communication control apparatus to:

determine whether a flow rate of a flow that is transferred through an optical line set between connection apparatuses in an optical line switching network is equal to or less than a threshold, wherein the connection apparatuses are connected through the optical line switching network and through an electric packet network, and each of the connection apparatuses is responsible for one or a plurality of devices; and in case where the flow rate of the flow is equal to or less than the threshold, cause to disconnect the optical line and cause a flow transmission source of the connection apparatuses to transmit packets relating to the flow through the electric packet network.

* * * * *